US008327821B2

(12) United States Patent
Guibert

(10) Patent No.: US 8,327,821 B2
(45) Date of Patent: Dec. 11, 2012

(54) METHOD OF INITIATING COMBUSTION IN AN INTERNAL COMBUSTION ENGINE, AND AN ENGINE APPLYING THE METHOD

(75) Inventor: Philippe Guibert, Fontenay le Fleury (FR)

(73) Assignees: Universite Pierre et Marie Curie (Paris 6), Paris (FR); Centre National de la Recherche Scientifique (CNRS), Paris (FR)

( * ) Notice: Subject to any disclaimer, the term of this patent is extended or adjusted under 35 U.S.C. 154(b) by 441 days.

(21) Appl. No.: 12/595,137

(22) PCT Filed: Apr. 7, 2008

(86) PCT No.: PCT/FR2008/000482
§ 371 (c)(1),
(2), (4) Date: Jan. 27, 2010

(87) PCT Pub. No.: WO2008/139065
PCT Pub. Date: Nov. 20, 2008

(65) Prior Publication Data
US 2010/0116242 A1    May 13, 2010

(30) Foreign Application Priority Data
Apr. 10, 2007    (FR) ...................................... 07 02614

(51) Int. Cl.
*F02B 19/14*    (2006.01)
*F02B 19/02*    (2006.01)
(52) U.S. Cl. ...................................... 123/275; 123/292
(58) Field of Classification Search ................ 123/48 A, 123/48 AA, 48 D, 48 R, 264, 270, 275, 285, 123/286, 292
See application file for complete search history.

(56) References Cited

U.S. PATENT DOCUMENTS

| | | | |
|---|---|---|---|
| 3,785,355 A | | 1/1974 | Toepel |
| 4,254,750 A | * | 3/1981 | Tanahashi et al. ............ 123/269 |
| 4,282,845 A | | 8/1981 | Nohira et al. |
| 5,014,663 A | * | 5/1991 | Melchior ....................... 123/257 |
| 5,067,458 A | * | 11/1991 | Bailey ............................ 123/292 |
| 5,081,970 A | * | 1/1992 | Matsuoka ...................... 123/275 |
| 5,178,109 A | * | 1/1993 | Kawamura .................... 123/292 |
| 5,950,593 A | * | 9/1999 | Matsuoka et al. ............. 123/292 |
| 5,970,944 A | * | 10/1999 | Kawamura .................... 123/258 |
| 6,055,954 A | * | 5/2000 | Takada et al. ................. 123/257 |
| 6,073,604 A | * | 6/2000 | Nakashima ................... 123/292 |
| 6,073,605 A | * | 6/2000 | Matsuoka et al. ............. 123/292 |
| 6,340,013 B1 | * | 1/2002 | Britton .......................... 123/255 |

(Continued)

FOREIGN PATENT DOCUMENTS

DE    39 03 474 A1    9/1989

(Continued)

*Primary Examiner* — John T. Kwon
*Assistant Examiner* — Johnny Hoang
(74) *Attorney, Agent, or Firm* — Sughrue Mion, PLLC

(57) ABSTRACT

A method of initiating combustion in an internal combustion engine that has a main chamber (5) of variable volume into which an ignitable mixture is introduced, an auxiliary chamber (10) opening out into the main chamber and a controlled valve unit (11, 14, 15) for putting the auxiliary chamber into communication with, or isolating it from, the main chamber. The method includes controlling the controlled valve to put the auxiliary chamber into communication with the main chamber during a period that includes the top dead center between the compression stage and the expansion stage. An engine is specially adapted to implement the method.

8 Claims, 2 Drawing Sheets

U.S. PATENT DOCUMENTS

| | | | |
|---|---|---|---|
| 6,848,413 B1* | 2/2005 | Suder et al. | 123/286 |
| 7,107,964 B2* | 9/2006 | Kojic et al. | 123/254 |
| 2002/0134345 A1* | 9/2002 | Adams | 123/285 |
| 2003/0056749 A1* | 3/2003 | Beckertgis | 123/292 |
| 2003/0075121 A1* | 4/2003 | Dixon | 123/48 A |
| 2005/0072399 A1* | 4/2005 | Kojic et al. | 123/254 |
| 2005/0087168 A1* | 4/2005 | Hwang | 123/254 |

FOREIGN PATENT DOCUMENTS

| | | |
|---|---|---|
| EP | 0 953 744 A1 | 11/1999 |
| FR | 2 078 819 A | 11/1971 |
| FR | 2 307 960 A1 | 11/1976 |

* cited by examiner

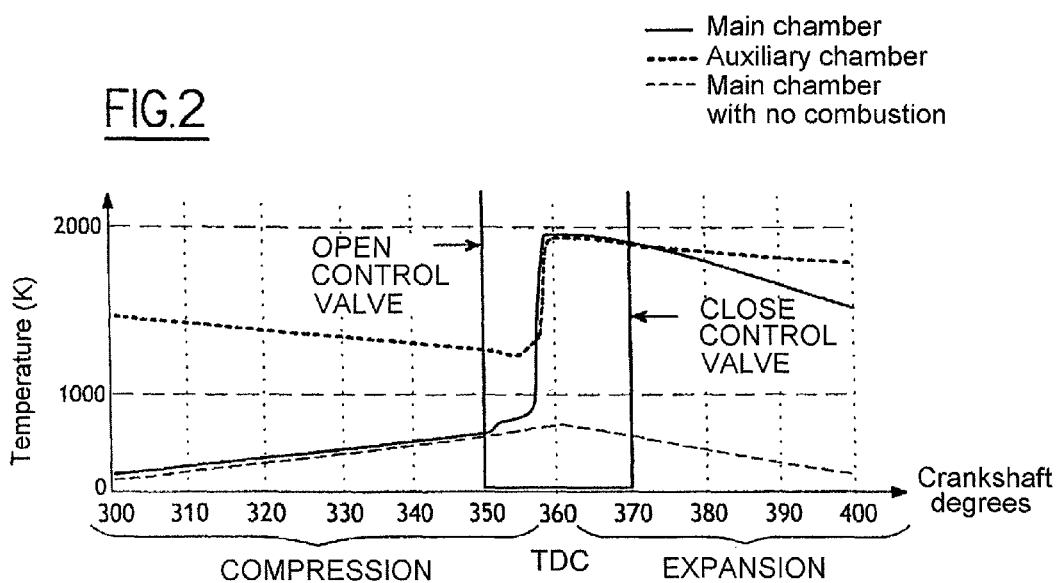
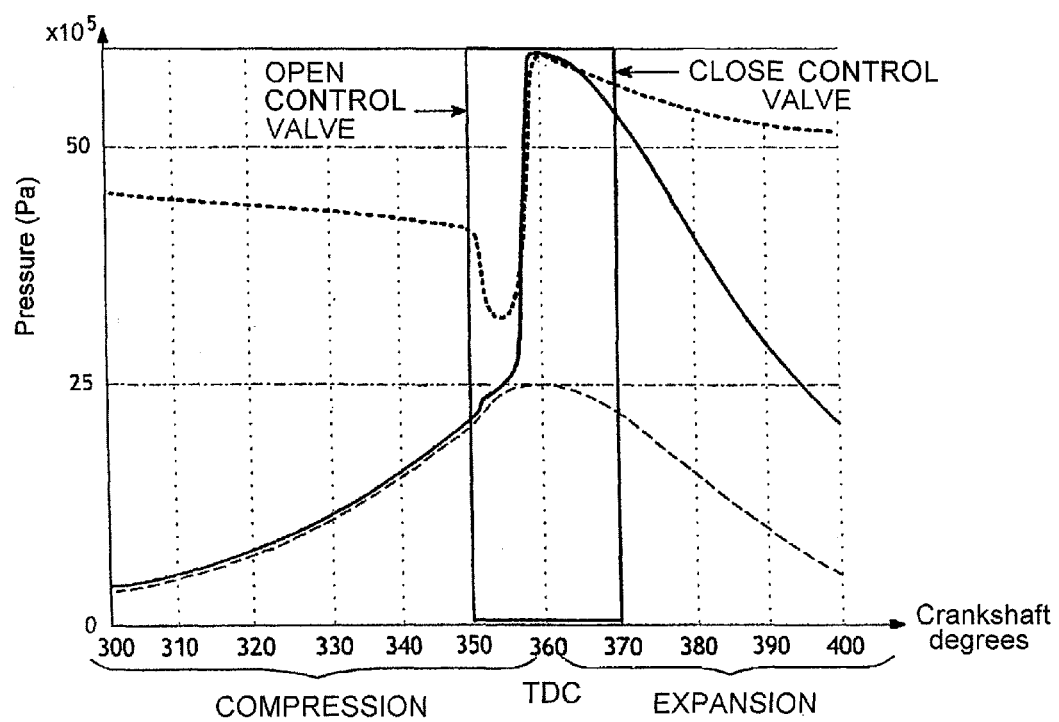

METHOD OF INITIATING COMBUSTION IN AN INTERNAL COMBUSTION ENGINE, AND AN ENGINE APPLYING THE METHOD

CROSS REFERENCE TO RELATED APPLICATIONS

This application is a National Stage of International Application No. PCT/FR2008/000482 filed Apr. 7, 2008, claiming priority based on FR 0702614 filed Apr. 10, 2007, the contents of all of which are incorporated herein by reference in their entirety.

The invention relates to a method of initiating combustion in an internal combustion engine, and to an engine applying the method.

BACKGROUND OF THE INVENTION

Various methods are known for initiating combustion in an internal combustion engine. Certain conventional methods consist in initiating combustion of the mixture locally either by generating a spark therein (controlled ignition), or by locally enriching the mixture so as to give rise to charge-compression ignition thereof. Combustion of the remainder of the mixture is then obtained either by propagation of a flame front, or by flame diffusion.

Recently, development effort has been applied to combustion by homogeneous charge-compression ignition (HCCI) which appears to be promising in terms of energy efficiency and in terms of preserving the environment.

Nevertheless, although homogeneous charge-compression ignition can be achieved nowadays over a narrow engine operating range, it is found difficult to achieve over a broad operating range. Homogeneous charge-compression ignition requires very tricky management of starting and of combustion progression. Present research is thus directed to very fine management of the thermodynamic conditions of the mixture (adapting the fuel, admission temperature, complex management of exhaust gas recirculation), or to introducing complex technologies such as variable compression ratios or variable distribution.

The invention seeks to provide a method of combustion by charge-compression ignition that is easily adaptable and that can be used over a wide operating range of the engine.

The following documents FR 2 078 819, EP 0 953 744, U.S. Pat. No. 4,282,845, and DE 39 03 474 disclose engines comprising:
- a main chamber of variable volume into which an ignitable mixture is introduced;
- an auxiliary chamber opening out into the main chamber; and
- controlled means for putting the auxiliary chamber into communication with the main chamber, or for isolating it therefrom;

OBJECT OF THE INVENTION

An object of the invention is to provide a novel method of initiating combustion in such an engine, which method is simple to implement and makes it possible to obtain homogeneous charge-compression ignition over a wide operating range of the engine.

BRIEF DESCRIPTION OF THE INVENTION

In order to achieve this object, the invention provides a method of initiating combustion in an internal combustion engine that comprises:
- a main chamber of variable volume into which an ignitable mixture is introduced;
- an auxiliary chamber opening out into the main chamber; and
- controlled means for putting the auxiliary chamber into communication with the main chamber, or for isolating it therefrom.

According to the invention, method includes the step of putting the auxiliary chamber into communication with the main chamber during a period that includes the top dead center between the compression stage and the expansion stage.

Thus, putting the auxiliary chamber into communication with the main chamber enables very hot burnt gas that was stored during a preceding cycle to be released into the main chamber, this gas being hot enough to cause the mixture to be heated sufficiently to reach its compression ignition at a plurality of sites. The mixture thus ignites in homogeneous manner. Then, once the mixture has ignited, around top dead center, the mixture burns and generates burnt gas that reaches high pressure and high temperature. The auxiliary chamber is then closed shortly after top dead center so as to hold captive therein a quantity of very hot burnt gas that will serve to initiate ignition of the mixture during the following cycle.

Furthermore, the burnt gas as stored in this way is likely still to contain reactive species that also contribute to initiating combustion of the mixture in the main chamber.

This combustion can be controlled very simply by adjusting the quantity and the timing of hot gas introduction into the main chamber, by appropriately controlling the controlled means for establishing communication. The method can thus be implemented over a wide operating range of the engine.

In the method of the invention, it should be observed that the auxiliary chamber is put into communication with the main chamber specifically at the moment when combustion is taking place. The burnt gas stored in the auxiliary chamber is therefore extremely hot, and it remains at a pressure that is high, and in any event always higher than the pressure in the main chamber. This method therefore differs essentially from known methods for this type of engine in which the control valve is opened well after combustion. For example, in document FR 2 078 819, the auxiliary chamber is put into communication with the main chamber during a time interval that covers the bottom dead top center between the expansion stage and the exhaust stage. The burnt gas has then cooled significantly and is at a low pressure, of the order of 1 to 2 bars above atmospheric pressure. The burnt gas as stored in that way cannot contribute to compression ignition of the mixture on being reintroduced into the main chamber. In document EP 0 953 744, the auxiliary chamber is put into communication with the main chamber around the bottom dead center between admission and compression for injecting the burnt gas which is stored in the auxiliary chamber, which burnt gas was previously stored by putting the auxiliary chamber into communication with the main chamber during the expansion stage, i.e. after the top dead center between compression and expansion. The burnt gas is therefore stored after it has already suffered significant cooling as a result of expansion, and it is reinjected during admission, thus at a moment when it cannot initiate compression ignition of the mixture since the mixture is not sufficiently compressed.

In document U.S. Pat. No. 4,282,845, the auxiliary chamber is put into communication with the main chamber a first time during compression and a second time during expansion, specifically excluding the combustion stage around top dead center between those two stages. Similarly, in document DE 39 03 474, the auxiliary chamber is put into communication twice with the main chamber, once during expansion and once during compression, on either side of the top dead center between those two stages.

In contrast to all of those documents, the method of the invention consists in putting the auxiliary chamber into communication with the main chamber specifically during a period that covers the top dead center between compression and expansion.

Furthermore, in known recirculation methods, the burnt gas is expelled during the expansion cycle and its temperature has therefore fallen to a value such that the expelled gas is no longer reactive nor is it sufficiently hot on its own to give rise to compression ignition of the mixture in the main chamber. On the contrary, the gas serves to dilute the mixture and to lower its temperature for the purpose of reducing the production of nitrogen oxides.

BRIEF DESCRIPTION OF THE DRAWINGS

The invention can be better understood in the light of the following description with reference to the figures of the accompanying drawings, in which:

FIG. 2 is a diagram showing the temperature variations in the various chambers of the engine shown in FIG. 1 as a function of crankshaft angle; and FIG. 3 is a diagram showing the variations in pressure in the various chambers of the engine shown in FIG. 1 as a function of crankshaft angle.

DETAILED DESCRIPTION OF THE INVENTION

Figure 1:
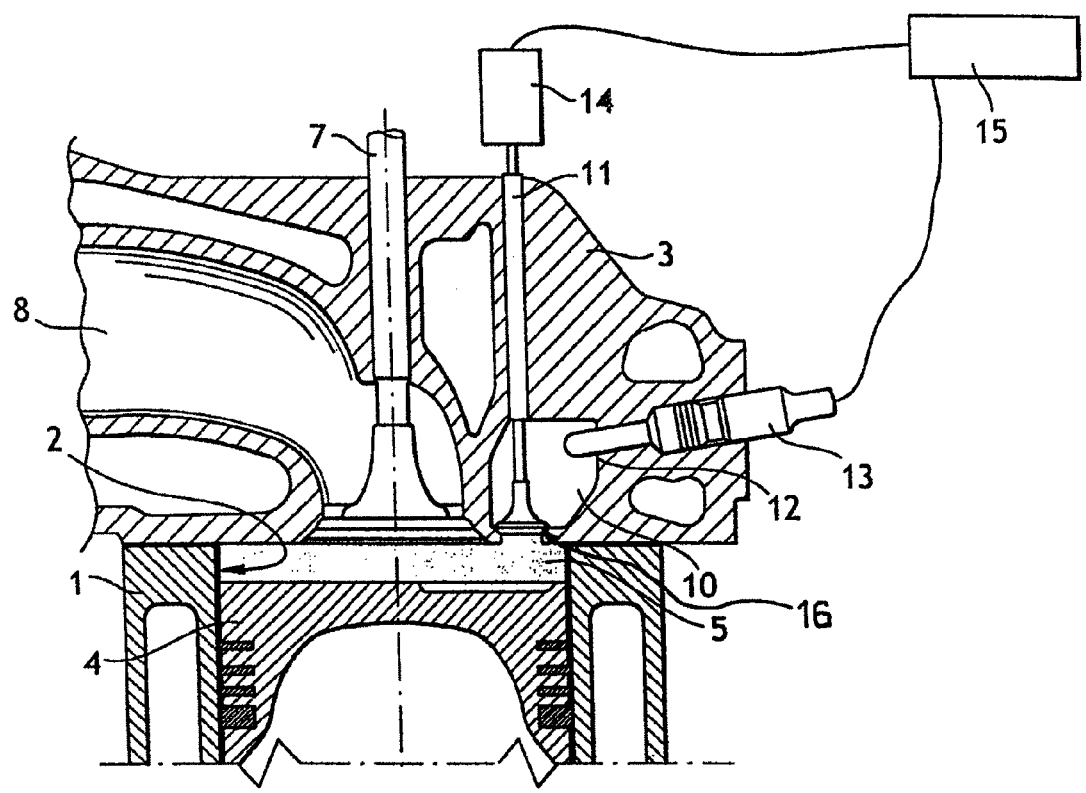
FIG. 1 is a fragmentary section view of a piston engine showing a main chamber.

The method of the invention is preferably implemented in an engine as shown in FIG. 1.

In conventional manner, the engine comprises a cylinder block 1 having cylinders 2 formed therein (only one cylinder is shown), which cylinders are closed at their top ends by a cylinder head 3. Each cylinder 2 has a piston 4 sliding in sealed manner therein. A main chamber 5 of variable volume is thus defined in each cylinder 2 between the cylinder head 3 and the piston 4.

An exhaust valve 7 is slidably mounted in the cylinder head 3 so as to move between a closed position isolating the main chamber 5 from an exhaust duct 8, and an open position putting the main chamber into communication with the exhaust duct 8. Similarly, and although not shown in FIG. 1, an admission valve is slidably mounted in the cylinder head 3 to move between a closed position isolating the main chamber 5 from an admission duct, and an open position putting the main chamber 5 into communication with the admission duct. All this is well known and does not form the subject matter of the invention.

The cylinder head 3 defines an auxiliary chamber 10 extending in the immediate proximity of the main chamber so as to open out therein. In this example the auxiliary chamber is lined internally with a thermal insulator 12. A control valve 11 is slidably mounted in the cylinder head 3 to move between a closed position isolating the main chamber 5 from the auxiliary chamber 10, and an open position putting the main chamber 5 into communication with the auxiliary chamber 10. In this example the control valve 11 is actuated by an electromechanical actuator 14. A glow plug 13 is mounted in the cylinder head 3 so as to project into the auxiliary chamber 10. The actuator 14 of the control valve 11 and the glow plug 13 are controlled by a computer 15.

The implementation of the invention is described in detail below with reference to FIGS. 2 to 3. In these figures, bold continuous-line curves represent respectively the temperature or the pressure in the main chamber 5; bold dashed-line curves represent respectively the temperature or the pressure in the auxiliary chamber 10.

The thermal cycle used is a cycle having four strokes, namely: admission; compression; expansion; and exhaust. The crankshaft angles plotted along the abscissa are measured in conventional manner, with the angle of 360° corresponding to the top dead center point between the compression stage and the expansion stage.

The cycle begins with an admission stage during which a mixture of air and fuel is admitted into the main chamber 5. Thereafter, during the compression stage, the pressure and the temperature in the main chamber 5 increase progressively, as shown by the beginnings of the continuous-line curves.

As described in detail below, the hot gas from an earlier combustion is held in the auxiliary chamber 10 by the control valve 11 that is kept closed. At the beginnings of the dashed-line curves, it can be seen that the pressure and the temperature of the hot gas held in the auxiliary chamber 10 decrease progressively as a result of heat exchange between the burnt gas and the cylinder head. Nevertheless, the thermal insulation 12 covering the wall of the auxiliary chamber 10 limits this heat exchange and thus limits the reduction in the pressure and the temperature of the hot gas held in the auxiliary chamber.

Towards 350 crankshaft degrees, i.e. at the end of compression, the control valve 11 is opened. The hot gas contained in the auxiliary chamber 10, which chamber is at a pressure higher than the pressure that exists in the main chamber 5, escapes from the auxiliary chamber 10 so as to spread into the main chamber.

This stirring causes the mixture in the main chamber 5 to be heated, as can be seen from the continuous-line curve, since the hot gases are at a temperature higher than that of the mixture. Towards 355 crankshaft degrees, the mixture is heated sufficiently to reach its compression ignition temperature. The mixture then enters into combustion by compression ignition. The multiplicity of compression ignition sites generated by the stirring of the hot gas with the mixture ensures that compression ignition is homogeneous. Compression ignition can be seen on the curves by the sudden rises in temperature and pressure that take place simultaneously in the main chamber 5 and in the auxiliary chamber 10.

Thereafter, the piston 4 passes through top dead center and begins to move back down again. The control valve 11 is closed towards 370 crankshaft degrees. A fraction of the burnt gas generated by the compression ignition of the mixture is thus held in the auxiliary chamber 10 to constitute the hot gas that will be used to initiate compression ignition of the mixture in the following cycle. This fraction of the burnt gas that is enclosed in the auxiliary chamber 10 is at high pressure and at high temperature. The remainder of the burnt gas that has remained in the main chamber 5 is subjected to expansion, so its temperature and pressure drop much more quickly than the temperature and pressure of the burnt gas fraction that has remained held in the auxiliary chamber 10.

On starting the engine, and during its initial cycles, compression ignition cannot occur since the gas enclosed in the auxiliary chamber 10 is not hot enough. In FIGS. 2 and 3, dashed lines plot the variations in pressure and temperature in the main chamber 5 when no compression ignition takes place. To cause the mixture to ignite, use is made of the glow plug 13. Once the engine has reached thermal conditions of operation that enable compression ignition of the mixture to be caused by contact with the hot gas released from the auxiliary chamber, the glow plug is switched off.

Thereafter, during operation under established thermal conditions, the adjustments of the engine (in particular its compression ratio) and of the characteristics of the reaction mixture (admission pressure, temperature, and composition) are advantageously selected in such a manner that no uncontrolled combustion can take place if the gas in the auxiliary chamber is not introduced into the main chamber.

The hot gas introduced into the main chamber thus contributes to heating the mixture, thereby enabling it to reach its compression ignition temperature, and it also contributes to diluting the mixture, thus enabling the combustion speed of the mixture to be controlled by introducing local non-uniformities that avoid bulk combustion. In addition, diluting the mixture enables its richness to be diminished, thus avoiding generating nitrogen oxides during combustion of the mixture.

It should be observed that in a particular aspect of the invention, the control valve presents the particular feature of being inverted relative to the other valves. As can be seen clearly in FIG. 1, the seat 16 of the control valve 11 faces towards the inside of the auxiliary chamber 10. The control valve 11 thus closes against its seat by moving downwards, whereas the other valves close against their seats by moving upwards. When the auxiliary chamber 10 is closed, the method of the invention thus leads to the pressure in the auxiliary chamber 10 being always higher than the pressure that exists in the main chamber 5. The inverted configuration of the control valve 11 thus enables the control valve 11 to be confirmed in its closed position against its seat 16 by the pressure that exists in the auxiliary chamber 10, which pressure is higher than the pressure that exists in the main chamber 5.

The invention is not limited to the above description, but on the contrary covers any variant coming within the ambit defined by the claims.

In particular, although it is stated that the mixture is mixed prior to admission, it is possible for mixing to take place directly in the chamber by injecting fuel into the main chamber during the compression stage.

The crankshaft angles at which the control valve opens and closes are given herein by way of indication. It is naturally advantageous to cause them to vary so as to take account in particular of the speed of rotation of the engine and the ignition delay of the mixture. Arrangements should preferably be made to ensure that the pressure peak occurs while the piston is substantially at top dead center, preferably a few degrees after top dead center, e.g. by acting on the instant and/or the duration of the opening of the control valve. The period during which the auxiliary chamber is in communication with the main chamber preferably extends over a range of substantially ±30° around the top dead center between compression and expansion.

Finally, although the method of the invention is implemented in an engine with a cylinder head that forms the auxiliary chamber and that carries a control valve with an inverted seat, it is possible to implement the invention with other types of engine, such as two-stroke engines. For example, the chamber in which the hot gas is stored may be off-set, with the hot gas being reintroduced into the main chamber, e.g. by means of an injector.

The invention claimed is:

1. A method of initiating combustion in an internal combustion engine having cycles including a compression stage and a expansion stage with a top dead center therebetween, the engine including:
   a main chamber of variable volume into which an ignitable mixture is introduced;
   an auxiliary chamber opening out into the main chamber;
   a controlled valve unit for putting the auxiliary chamber into communication with, or isolated from, the main chamber; and
   a glow plug mounted so as to project into the auxiliary chamber, the method comprising:
   controlling the controlled valve unit to put the auxiliary chamber into communication with the main chamber during a period that includes the top dead center between the compression stage and the expansion stage, so that burned gas trapped in the auxiliary chamber during a preceding cycle are stirred within the ignitable mixture and generate multiple compression ignition sites to cause auto-ignition of the ignitable mixture within the main chamber; and
   when thermal conditions of operation that enable compression ignition of the ignitable mixture to be caused by contact with hot gas released from the auxiliary chamber are not met, using the glow plug to cause ignition of the mixture.

2. A method according to claim 1, wherein the period extends over a range of ±30° around said top dead center.

3. A method according to claim 1, wherein the auxiliary chamber is thermally insulated so as to limit cooling of said burnt gas enclosed in the auxiliary chamber.

4. A method according to claim 1, wherein at least one of an instant and/or a duration of opening the controlled valve unit is modified.

5. An internal combustion engine having cycles including a compression stage and a expansion stage with a top dead center therebetween, the engine comprising:
   a main chamber of variable volume into which an ignitable mixture is introduced;
   an auxiliary chamber opening out into the main chamber; and
   controlled valve unit for selectively putting the auxiliary chamber into communication with the main chamber during a period that includes the top dead center between the compression stage and the expansion stage so that burnt gas trapped in the auxiliary chamber during a preceding cycle are stirred within the ignitable mixture and generate multiple compression ignition sites to cause auto-ignition of the ignitable mixture within the main chamber;
   a glow plug mounted so as to project into the auxiliary chamber and used when thermal conditions of operation, which enable compression ignition of the ignitable mixture to be caused by contact with hot gas released from the auxiliary chamber, are not met.

6. An internal combustion engine according to claim 5, wherein the controlled valve unit comprises a control valve that co-operates with a seat that faces towards the auxiliary chamber such that pressure in the auxiliary chamber higher than pressure in the main chamber confirms the control valve in its closed position against its seat.

7. An internal combustion engine according to claim 6, wherein the controlled valve unit comprises a computer.

8. An internal combustion engine according to claim 7, wherein the controlled valve unit comprises a valve actuator.

* * * * *